United States Patent [19]

Mitsubayashi et al.

[11] Patent Number: 4,786,002
[45] Date of Patent: Nov. 22, 1988

[54] METHOD OF MAKING SOFT ICE-DRINK AND APPARATUS OF MAKING THE SAME

[75] Inventors: Yoshihiko Mitsubayashi; Toshio Ando, both of Kuwana, Japan

[73] Assignee: Chubu Industries, Inc., Kuwana, Japan

[21] Appl. No.: 118,139

[22] Filed: Nov. 9, 1987

Related U.S. Application Data

[62] Division of Ser. No. 53,971, May 26, 1987, abandoned.

[30] Foreign Application Priority Data

Jun. 18, 1986 [JP]  Japan ................. 61-141754
Feb. 17, 1987 [JP]  Japan ................. 62-21594[U]
Feb. 17, 1987 [JP]  Japan ................. 62-21595[U]
Feb. 17, 1987 [JP]  Japan ................. 62-21596[U]
Feb. 17, 1987 [JP]  Japan ................. 62-21597[U]

[51] Int. Cl.$^4$ ............................................ B02C 19/00
[52] U.S. Cl. ...................... 241/101 B; 241/DIG. 17; 366/279
[58] Field of Search ................... 291/101 B, DIG. 17; 366/279, 205, 206, 314, 347

[56] References Cited

U.S. PATENT DOCUMENTS 2,774,576 12/1956 Frank ................................. 366/205
3,679,140 7/1972 Kaishita ......................... 241/DIG. 7
3,837,587 9/1974 Chambers ....................... 241/101 B
4,055,099 10/1977 Mitsubayashi ............. 241/DIG. 17

Primary Examiner—Robert W. Jenkins
Attorney, Agent, or Firm—Fulbright & Jaworski

[57] ABSTRACT

An apparatus of making a soft ice-drink comprises a mixing mechanism including a container containing a liquid material such as syrup and into which shaved ice pieces are discharged, rotary blades, rotatably supported within the container, for mixing together the liquid material and shaved ice pieces and smashing the shaved ice pieces into granules of ice, and a drive motor for rotating the rotary blades at high speeds, and an ice shaving mechanism, disposed on an apparatus bed and above the mixing mechanism, including a shaver casing having a slit to which a shaving blade is exposed and a shaved ice dischage chute opened to above the container, and rotatable blades, provided within the shaver casing, for cooperating with the shaving blade to shave ice blocks charged into the shaver casing.

3 Claims, 3 Drawing Sheets

METHOD OF MAKING SOFT ICE-DRINK AND APPARATUS OF MAKING THE SAME

This is a division of application Ser. No. 053,971 filed 05/26/87, now abandoned.

BACKGROUND OF THE INVENTION

1. Field of the Invention

This invention relates to a method of making a soft drink at relatively low temperatures by mixing a liquid material such as syrup, honey or fruit juice with saved ice and an apparatus of making the same.

2. Description of the Prior Art

Conventionally, there has been available semi-refrigerated soft ice-drink as represented by, for example, sherbet in which a principal raw material such as fruit juice is semi-frozen. Fruit juice and milk charged into a refrigerator are cooled and stirred thereby to make the sherbet. Another making method is known wherein syrup and water are added with carbon-dioxide gas and frozen and bubbled with a refrigerator while being stirred to thereby prepare the sherbet.

In any conventional methods, however, a liquid drink material is stirred and cooled with a refrigerator so as to be partly iced and consequently a resulting drink, even if foam-like and soft, contains iced pieces which advantageously give an actual feeling of cold to tactile impression in the mouth when the consumer tastes the drink but contrarily, often give an uncomfortable feeling to the tongue.

SUMMARY OF THE INVENTION

The present invention intends to eliminate the prior art disadvantage and has for its object to provide a method of making a cold soft ice-drink containing syrup, fruit juice or the like as a principal raw material and which does not give a feeling of existence of iced pieces to the consumer and an apparatus of making the same.

According to a method of making a soft ice-drink of the invention, to accomplish the above object, ice blocks are shaved into shaved ice pieces, the shaved ice pieces are discharged into a container containing a liquid material such as syrup, the shaved ice pieces and liquid material are mixed together by means of high-speed rotary blades rotatably supported within the container to form a mixture in which the shaved ice pieces are smashed into granules of ice while air is entrained during mixing to bubble the mixture. Thus, since in this method of the present invention ice blocks are shaved into shaved ice pieces and discharged into the container containing the liquid material such as syrup and the ice pieces and liquid material are mixed together by the high-speed rotary blades to form the mixture in which the shave ice pieces are smashed into ice granules while are is entrained during mixing to bubble the mixture, a very soft, conventionally non-existent drink can be prepared which is removed of iced pieces and is cold and comfortable to the tongue.

An apparatus of making a soft ice-drink according to the invention comprises a mixing mechanism including a container containing a liquid material such as syrup and into which shaved ice pieces are discharged, rotary blades, rotatably supported within the container, for mixing together the liquid material and shaved ice pieces and smashing the shave ice pieces into granules of ice, and a drive motor for rotating the rotary blades at high speeds, and an ice shaving mechanism, disposed on an apparatus bed and above the mixing mechanism, including a shaver casing having a slit to which a shaving blade is exposed and a shaved ice discharge chute opened to above the container, and rotatable blades, provided within the shaver casing, for cooperating with the shaving blade to shave ice blocks charged into the shaver casing. With the soft ice-drink making apparatus, shaved ice can automatically be discharged into the container of the mixing mechanism through the discharge chute of the ice shaving mechanism, and the mixing mechanism and the ice shaving mechanism both disposed on the very single apparatus bed can be interlocked with each other.

According to an embodiment of the invention, an ice block reservoir having, at its top, an openable lid and a transparent cylindrical wall with a lower, inner funnel-like wall is detachably mounted on the top of the ice shaving mechanism, whereby excess and deficiency of necessary ice blocks can be inspected visually from the outside to ensure that ice blocks can appropriately supplemented as necessary at all times and charged ice blocks can automatically be supplied to the ice shaving mechanism smoothly and continuously.

According to another embodiment of the invention, the upper portion of a rotary shaft carrying the rotary blades of the mixing mechanism extends upwards nearby the opening of the container and has a square form in horizontal crosssection, whereby part of air drawn into the container during mixing, except for air turning into bubbles, can rise along the rotary shaft so as to be dissipated to the outside, without stagnating in the container to form a void and smashing and mixing by the rotary blades can be carried out with very high efficiency.

According to still another embodiment of the invention, a soft lid for covering the opening of the container is detachably mounted to a lower end portion of the shaved ice discharge chute of the ice shaving mechanism, whereby ice granules and liquid material can be prevented by the soft lid from scattering to the outside of the container during mixing, thereby preventing the apparatus and its environments from being contaminated, and the soft lid can be detached and cleaned to readily remove any ice granules and liquid material colliding against the back of the lid and deposited thereon. A contaminated lid can thus be cleaned for remounting or alternatively, exchanged with a new one.

According to still another embodiment of the invention, the electric motor for driving the rotary blades of the mixing mechanism is disposed laterally of the container within the area of the apparatus bed, whereby the height of the mixing mechanism can be reduced as compared to the case in which the drive motor is disposed beneath the container, ensuring that work of charging ice blocks into the ice shaving mechanism can considerably be facilitated especially where an ice reservoir is mounted on the ice shaving mechanism in order for the ice shaving mechanism to retain a great number of ice blocks, and that centroid position can be lowered to permit stable operation of the apparatus.

DESCRIPTION OF THE PREFERRED EMBODIMENTS

Ice Shaving Mechanism

Figure 1:
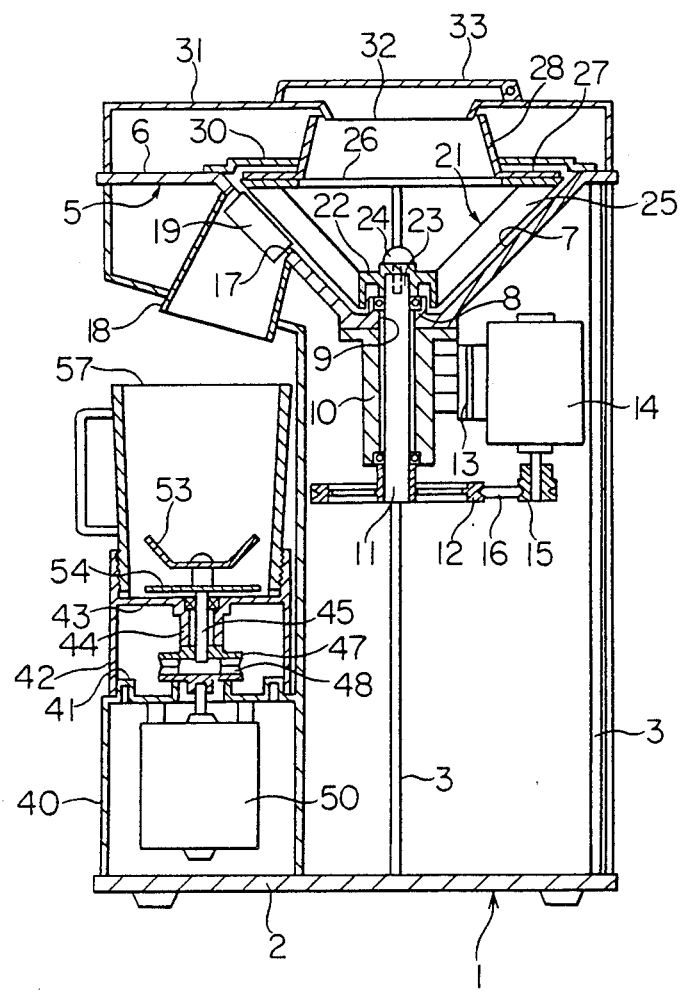
FIG. 1 is a longitudinally sectioned front view of an apparatus of making a soft ice-drink according to a first embodiment of the invention.
Figure 2:
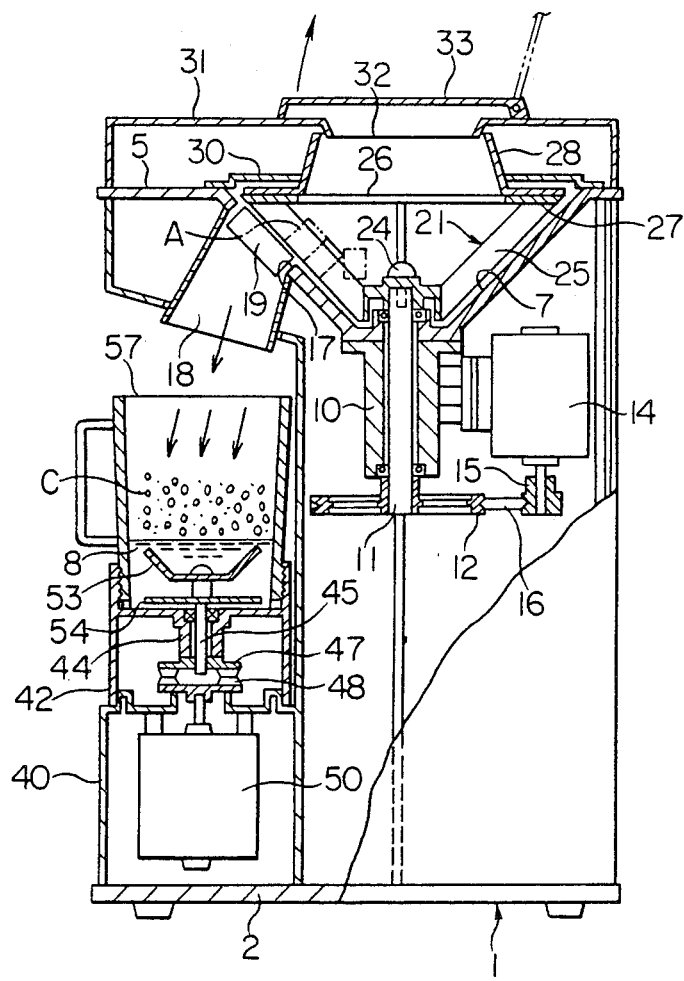
FIG. 2 is a similar sectional view for explaining the operation of the first embodiment.

In a first embodiment of the invention as diagrammatically shown in FIGS. 1 and 2, an apparatus bed 1 has a base plate 2 and a plurality of struts 3 standing uprightly on the base plate 2. Detachably mounted to upper ends of these struts is a planar portion 6 of a frame 5 which is formed, at the remainder excepting the planar portion 6, into an inverted conical shaver casing 7.

The shaver casing 7 of the frame 5 has a central boss 8 with the back thereof fixedly mounted with the upper end of a cylindrical shaft housing 10 in which a rotary shaft 11 is journalled vertically, having its upper end passing through a center hole 9 of the boss 8 to project therefrom upwards and its lower end passing through the housing 10 to project therefrom downwards, the lower projecting portion of the rotary shaft 11 being fixedly mounted with a pulley 12. A support arm 13 extends laterally of the housing 10 and a first electric motor 14 is attached to the support arm 13. An tensive belt 16 is applied on the pulley 12 and a pulley 15 fixed to the shaft of the motor 14.

Formed in the shaver casing 7 is an opening or slit 17 within which a shaving blade 19 is removably supported such that the amount of its projection into the shaver casing 7 is adjustable. A shaved ice discharge chute 18 contiguous to the opening 17 is provided on the shaver casing 7.

The rotary shaft 11 passing through the center hole 9 of the boss 8 has the upper projecting portion which is slidably inserted in a center recess 23 formed in the lower surface of a boss 22 of a transfer rotor 21, and the rotary shaft 11 is removably and securely connected to the boss 22 by means of a bolt 24. The transfer rotor 21 comprises several blades 25 which extend radially from the boss 22 with their bottom surfaces opposing the top surface of the shaver casing 7 in substantially parallel relationship therewith, an annular plate 26 which connects tips of the blades 25 together, and a hopper 28 having a flange 27 which extends outwards from the lower circumferential skirt of the hopper and at which the hopper 28 is removably and securely mounted to the annular plate 26 by means of setscrews not shown. A water-proof cover 30 abutting againts the circumferential periphery of the hopper 28 is mounted on the planar portion 6. Disposed above the hopper 28 is a scatter preventive cover 31 which is removably and securely mounted, at its lower end, to the planar portion 6 of the frame 5 by means of setscrews not shown. The top of the cover 31 is formed with an opening 32 that opposes the hopper 28. A lid 33 for opening or closing the opening 32 is pivotally and removably mounted on the cover 31.

Mixing Mechanism

Under the discharge chute 18, a support box 40 is disposed on the base plate 2. The support box 40 has, at its top, an engaging projection 41 and a cylindrical container stand 42 for engagement with the engaging projection 41 is removably mounted on the support box 40. An intermediate partition wall 43 extends from the inner circumeferential wall of the container stand 42 and has a center boss 44 in which a rotary shaft 45 is journalled vertically, having its upper end passing through a center hole of the boss 44 to project upwards and its lower end likewise passing through the center hole to project downwards, the downward projecting portion of the rotary shaft 45 being fixedly mounted with an upper coupling 47.

A lower coupling 48, disposed beneath the upper coupling 47 and being engagable and disengagable therewith, is rotably supported on the support box 40.

Placed within the support box 40 is a second electric motor 50 having it shaft connected with the lower coupling 48.

The upper end of the rotary shaft 45 extends into a container 57 and fixedly carries an upper rotary blade 53 for mixing and a lower knife-like rotary blade 54 for smashing which is vertically spaced apart from the upper rotary blade 53. The upper inner circumferential end of the container stand 42 meshes with the lower outer circumferential end of the container 57 in watertight fashion. The motors 14 and 50 are interlocked for rotation by means of a control circuit not shown.

The operation of the first embodiment will now be described.

The lid 33 is first opened in a direction as indicated by arrow and ice blocks A such as in cubic form are charged, by an appropriate number, into the shaver casing 7 of the frame 5 through the opening 32. The lid 33 is then closed.

Subsequently, the container 57 along with the container stand 42 is removed from the support box 40 and an appropriate amount of liquid material B such as syrup is poured into the container 57. Thereafter, the container 57 along with the container stand 42 is supportingly placed on the support box 40 such that the upper coupling 47 is brought into engagement with the lower coupling 48. After completion of the preparatory procedure as such, a power supply switch (not shown) is turned on. This activates the control circuit so that the first motor 14 of the ice shaving mechanism is initially started to permit the shaving blade 19 to shave the ice blocks A, and the thus shaved ice pieces C are discharged into the liquid material B present within the container as indicated by arrows.

The second motor 50 of the mixing mechanism is subsequently started to rotate the rotary blades 53 and 54 at high speeds, thereby ensuring that the shaved ice pieces C and liquid material B can be urged to run as a vertically-directed eddy-like whirling stream which, within the container 57, drops depressively at the center to generate air bubbles and whirls and rises at the outer side. Consequently, the shaved ice pieces C are smashed or further granulated and admixed with the liquid material B to form a predetermined amount of soft ice-drink. Following the formation of the soft ice-drink, the motor 14 is initially stopped to cease the supply of shaved ice pieces C and thereafter the motor 50 is stopped.

When the soft ice-drink has been prepared which is a mixture of the liquid material B and granulated, shaved ice C as well as air bubbles, the container 57 along with the container stand 42 is removed from the support box 40 by releasing the engagement of the coupling 47 with the coupling 48 and the drink within the container 57 is poured into a cup for services.

The thus prepared drink is removed of the feeling due to the existence of iced pieces and is so soft that it gives a very comfortable feeling to the tongue, exhibiting the intermediate quality between conventional cream and sherbet. Further, the granules of shaved ice in the drink are trapped in bubbles and so they are difficult to dissolve. Consequently, the drink can remain sufficiently cooled until it is served for consumers after poured into a cup.

Figure 3:
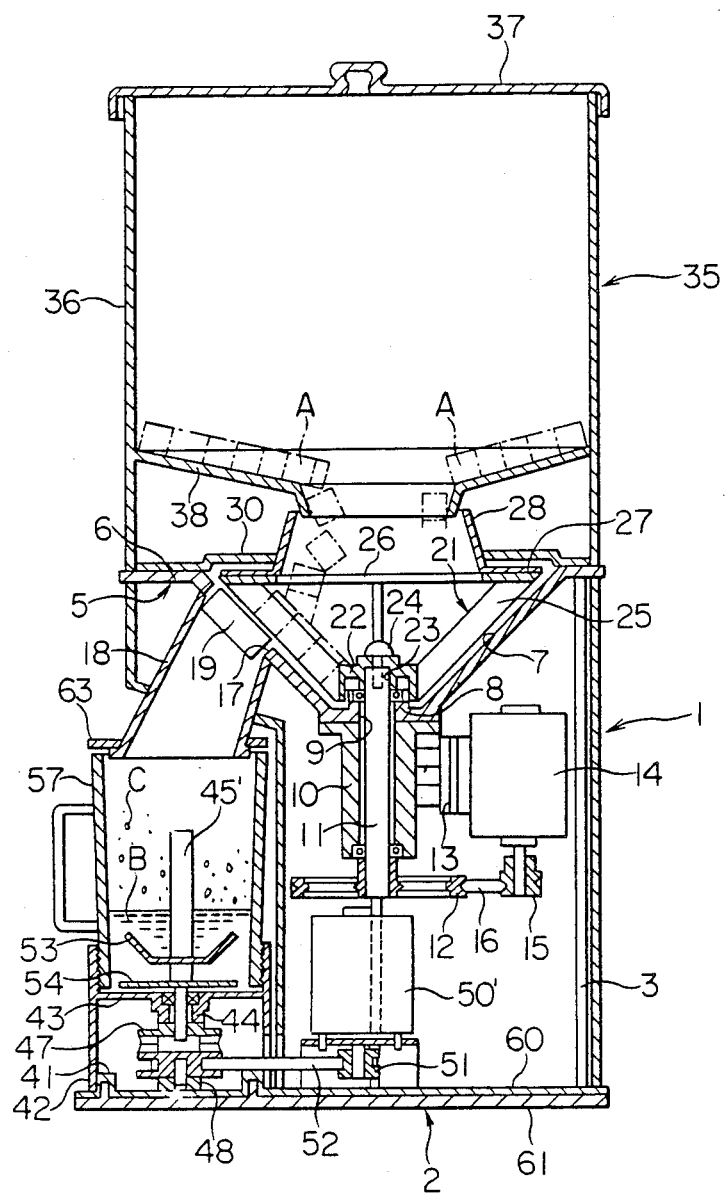
FIG. 3 is a sectional view similar to FIG. 1 and illustrating an apparatus of making a soft ice-drink according to a second embodiment of the invention.

Turning to FIG. 3, a second embodiment of the invention will be described.

The second embodiment almost resembles the previously-described first embodiment, and like parts are designated by like reference numerals and need not be described herein. Principally, only different parts will therefore be described.

Firstly, in regard of an ice shaving mechanism of the second embodiment, an ice black reservoir 35 substitutes for the cover 31, opening 32 and lid 33 of the first embodiment and is detachably mounted to the planar portion 6 by means of, for example, bolts not shown. The reservoir 35 comprises a cylindrical transparent circumferential wall 36, a lid 37 removably mounted on the upper end of the circumferential wall, and a funnel-like wall 38 secured to the inner side of the circumferential wall 36 and having an opening which is in communication with the hopper 28.

In shaving ice with such an ice shaving mechanism, the lid 37 is first dismounted and a great number of ice blocks A such as in cubic form are charged into the reservoir 35. The lid 37 is then mounted. A soft ice-drink is then prepared similarly to the first embodiment.

Because the ice reservoir 35 has precedently been charged with a great number of ice blocks when making soft ice-drink in this manner, a great amount of soft ice-drink can be prepared at a time. This can conveniently be done because the ice blocks A charged into the reservoir 35 are interlocked with movement of ice blocks in the shave casing 7 so as to be automatically moved to the center opening of the funnel-like wall 38 along the inclined surface thereof and eventually drawn into the shaver casing 7 through the hopper 28. As shaving proceeds, the number of ice blocks A within the reservoir 35 decreases. This condition can be inspected visually from the outside thanks to transparency of the circumferential wall 36 and ice blocks can be supplementarily charged into the reservoir 35 as necessary.

A mixing mechanism of the second embodiment is different from that of the first embodiment in that the upper portion of a rotary shaft 45 carrying rotary blades 53 and 54 extends upwards nearby the opening of the container 57 and has a square form in horizontal crossection. Essentially, in the first embodiment, shaved ice pieces C discharged into the container 57 are urged to run together with liquid material B by means of the high-speed rotary blades 53 and 54 of the mixing mechanism, in the form of a vertically-directed whirling stream which depressively drops at the center of the container 57 to entrain ambient air and rises at the outer side. On the other hand, granules of smashed ice pieces stagnate at an upper portion of the container 57 to form a partition wall which forces part of air, except for dessending air turning into bubbles, to stagnate near the rotary blades 53 and 54 to thereby form a void in the vicinity of these rotary blades, thus causing a phenomenon that the rotary blades 53 and 54 are subjected to racing to impair the smashing and mixing function.

In the second embodiment, however, the rotary shaft 45' of the above configuration permits the air to smoothly rise along the rotary shaft 45' so as to be dissipated to the outside, thereby succeeding in preventing the occurrence of the aforementioned phenomenon.

Further, in the second embodiment, a soft lid 63 is detachably mounted to a lower end portion of the shaved ice discharge chute 18 of the ice shaving mechanism to cover the opening of the container 57. In this mixing mechanism, when the rotary blades 53 and 54 are operating to smash shaved ice pieces C and admix granules of ice with liquid material B, the ice granules and liquid material are excited by being exerted with centrifugal raising force by means of the rotary blades 53 and 54 and tend to scatter to the outside of the container 57 by way of the circumferential edge of the upper opening of the container. Advantageously, however, the excited ice granules and liquid material can collide against the back ofthe lid 63 and scattering can collapse. The lid 63 can be detached from the discharge chute 18 and cleaned to remove any deposits generated by the collision on the back of the lid 63. A contaminated lid 63 is cleaned in this manner and remounted or alternatively, exchanged with a new one.

Further, in this embodiment, a second electric motor 50' is not supported beneath the container 57 but is disposed laterally of the container 57 and directly on the base plate 2, and an tensive belt 52 is applied on a pulley 51 fixed to the motor shaft of the motor 50' and the coupling 48. Accordingly, the height of the mixing mechanism can be reduced as compared to the first embodiment. This considerably facilitates work of charging ice blocks into the ice block reservoir 35 and permits lowering centroid position which is effective for stable operation of the apparatus.

In the second embodiment, the base plate 2 is comprised of an upper aluminum plate 60 and a lower metal plate 61.

Although a particular preferred embodiment of the invention has been disclosed in detail for illustrative purposes, it will be recognized that variations or modificutions of the disclosed apparatus, including the rearrangements of parts, lie within the scope of the present invention.

What is claimed is:

1. An apparatus of making a soft ice-drink comprising:
   a mixing mechanism including a container containing a liquid material such as syrup and into which shaved ice pieces are discharged, rotary blades, rotatably supported within said container, for mixing together the liquid material and shaved ice pieces and smashing said ice pieces into granules of ice, and a drive motor for rotating said rotary blades at high speeds; and
   an ice shaving mechanism, disposed on an apparatus bed and above said mixing mechanism, including a shaver casing having a slit to which a shaving blade is exposed and a shaved ice discharge chute opened to above said container, and rotatable blades, provided within said shaver casing, for cooperating with said shaving blade to shave ice blocks charged into said shaver casing, wherein a soft lid for covering the opening of said container is detachably mounted to a lower end portion of said shaved ice discharge chute of said ice shaving mechanism.

2. A soft ice-drink making apparatus according to claim 1, wherein an ice block reservoir having, at its top, an openable lid and a transparent cylindrical wall with a lower, inner funnel-like wall is detachably mounted on the top of said ice shaving mechanism.

3. A soft ice-drink making apparatus according to claim 1, wherein the upper portion of a rotary shaft carrying said rotary blades of said mixing mechanism extends upwards nearby the opening of said container and has a square form in horizontal crosssection.

* * * * *

UNITED STATES PATENT OFFICE
CERTIFICATE OF CORRECTION

Patent No. 4,786,002　　　　　　　　Dated November 22, 1988

Inventor(s) Yoshihiko Mitsubayashi et al.

It is certified that error appears in the above-identified patent and that said Letters Patent is hereby corrected as shown below:

Column 1, line 12, delete "saved" and insert -- shaved --

Column 1, line 56, delete "shave" and insert -- shaved --

Column 1, line 57, delete "are" and insert -- air --

Column 3, line 51, delete "againts" and insert -- against --

Column 5, line 36, delete "shave" and insert -- shaver --

Column 5, line 47, change "45" to -- 45' --

Column 6, line 13, change "ofthe" to -- of the --

Signed and Sealed this

Twenty-third Day of May, 1989

*Attest:*

DONALD J. QUIGG

*Attesting Officer*　　　　*Commissioner of Patents and Trademarks*